(12) United States Patent
Ookubo

(10) Patent No.: US 8,454,920 B2
(45) Date of Patent: Jun. 4, 2013

(54) SILICON PURIFICATION METHOD

(75) Inventor: Yasuo Ookubo, Tsukuba (JP)

(73) Assignee: ULVAC, Inc., Chigasaki-Shi (JP)

( * ) Notice: Subject to any disclaimer, the term of this patent is extended or adjusted under 35 U.S.C. 154(b) by 159 days.

(21) Appl. No.: 13/058,455

(22) PCT Filed: Aug. 12, 2009

(86) PCT No.: PCT/JP2009/064266
§ 371 (c)(1),
(2), (4) Date: Feb. 10, 2011

(87) PCT Pub. No.: WO2010/018849
PCT Pub. Date: Feb. 18, 2010

(65) Prior Publication Data
US 2011/0135559 A1    Jun. 9, 2011

(30) Foreign Application Priority Data

Aug. 15, 2008   (JP) ................. P2008-209218

(51) Int. Cl.
*C01B 33/02*   (2006.01)
(52) U.S. Cl.
USPC ......................................................... 423/348
(58) Field of Classification Search
USPC ................................................. 423/348–349
See application file for complete search history.

(56) References Cited

U.S. PATENT DOCUMENTS

| 5,182,091 A | * | 1/1993 | Yuge et al. | 423/348 |
|---|---|---|---|---|
| 5,510,095 A | * | 4/1996 | Aratani et al. | 423/348 |
| 5,961,944 A | * | 10/1999 | Aratani et al. | 423/348 |
| 6,036,932 A | * | 3/2000 | Hongu et al. | 423/348 |
| 6,231,826 B1 | * | 5/2001 | Hanazawa et al. | 423/348 |
| 6,994,835 B2 | * | 2/2006 | Sasatani et al. | 423/348 |
| 7,682,585 B2 | * | 3/2010 | Lynch et al. | 423/348 |
| 7,704,478 B2 | * | 4/2010 | Yamauchi et al. | 423/348 |

FOREIGN PATENT DOCUMENTS

| JP | 7-267624 | | 10/1995 |
|---|---|---|---|
| JP | 7-277722 | | 10/1995 |
| JP | 10-182134 | | 7/1998 |
| JP | 10-182135 | | 7/1998 |
| JP | 10182134 A | * | 7/1998 |
| JP | 10-273311 | | 10/1998 |
| JP | 2000-327488 | | 11/2000 |
| JP | 2001-335854 | | 12/2001 |

OTHER PUBLICATIONS

International Search Report from corresponding PCT Application No. PCT/JP2009/064266 dated Nov. 17, 2009.

* cited by examiner

*Primary Examiner* — Anthony J Zimmer
(74) *Attorney, Agent, or Firm* — Grossman, Tucker, Perreault & Pfleger, PLLC

(57) ABSTRACT

A silicon purification method includes: loading a base material that is a starting material made of metallic silicon into a graphite crucible, heating and melting all of the base material which is disposed in an acidic inert gas atmosphere, maintaining the molten base material in the graphite crucible, and thereby oxidatively purifying the base material; loading the oxidatively-purified base material into a water-cooled crucible, gradually solidifying the base material after the base material disposed in a high vacuum atmosphere is fully molten, and thereby removing an unsolidified portion; and fully melting the base material which is disposed in a high vacuum atmosphere and in which the unsolidified portion is removed, and maintaining the base material in the water-cooled crucible.

7 Claims, 4 Drawing Sheets

SILICON PURIFICATION METHOD

CROSS-REFERENCE TO RELATED APPLICATIONS

This is the U.S. National Phase Application under 35 U.S.C §371 of International Patent Application No. PCT/JP2009/064266 filed Aug. 12, 2009, which designated the United States and was published in a language other than English, which claims the benefit of Japanese Patent Application No. 2008-209218 filed on Aug. 15, 2008, both of them are incorporated by reference herein. The International Application was published in Japanese on Feb. 18, 2010 as WO2010/018849 A1 under PCT Article 21(2).

BACKGROUND OF THE INVENTION

1. Field of the Invention

The present invention relates to a silicon purification method using a metallic silicon material (a base material made of metallic silicon) as a starting material, and particularly to a silicon purification method that can purify high purity silicon which is suitable for a solar cell material and has a low impurity content of phosphorus (P), oxygen (O), boron (B), carbon (C), iron (Fe), aluminum (Al), calcium (Ca), titanium (Ti) or the like.

2. Background Art

As a conventional silicon purification method, for example, the method described below is known (refer to Japanese Unexamined Patent Application, First Publication No. H10-182134).

In this method, a metallic silicon material (a base material made of metallic silicon) with a predetermined purity is prepared (refer to Step S11 in FIG. 3B) as a starting material, then the metallic silicon material is subjected to, firstly, a reduced-pressure purification and then vacuum refining, whereby P that is an impurity contained in the metallic silicon material is removed by volatilization (refer to Step S12 in FIG. 3B).

Next, the metallic silicon material is subjected to oxidative purification, whereby B or C contained in the metallic silicon which has been purified under reduced-pressure is removed (refer to Step S14 in FIG. 3B).

Next, the metallic silicon material is again subjected to reduced-pressure purification, whereby O contained in the oxidatively purified metallic silicon is removed (refer to Step S15 in FIG. 3B).

Next, the metallic silicon material is subjected to solidification purification (by which a molten metal portion is solidified unidirectionally, and the residual molten metal portion is removed by casting), whereby metal impurities, such as Fe, Al, Ca, and the like, contained in the metallic silicon from which O has been removed are removed (refer to Step S16 in FIG. 3B).

However, silicon used for manufacturing a solar cell demands a low impurity concentration, therefore the impurity concentration of any of, for example, Fe, Al, Ca, Ti, and P needs to be less than 0.1 ppm.

Consequently, depending on the impurity concentration of a starting material, there are cases in which the above conventional silicon purification method cannot produce high-purity silicon that satisfies such a condition.

As a conventional silicon purification method that purifies high-purity silicon which is to be used to manufacture a solar cell, the method described below is known (refer to Japanese Unexamined Patent Application, First Publication No. 2000-327488).

In this method, as a starting material, a metallic silicon material (a base material made of metallic silicon) with a predetermined purity is prepared (refer to Step S11 in FIG. 3B), then the metallic silicon material is subjected to, firstly, a reduced-pressure purification and then vacuum refining, whereby phosphorous that is an impurity contained in the metallic silicon material is removed by volatilization (refer to Step S12 in FIG. 3B).

Next, the metallic silicon material is subjected to solidification purification (by which a molten metal portion is solidified unidirectionally, and the residual molten metal portion is removed by casting), whereby metal impurities, such as Fe, Al, Ca, and the like, contained in the metallic silicon which has been purified under reduced-pressure are removed (refer to Step S13 in FIG. 3B).

Next, the metallic silicon material is subjected to oxidative purification, whereby B or C contained in the solidification-purified metallic silicon is removed (refer to Step S14 in FIG. 3B).

Next, the metallic silicon material is again subjected to reduced-pressure purification, whereby O contained in the oxidatively purified metallic silicon is removed (refer to Step S15 in FIG. 3B).

Finally, the metallic silicon material is again subjected to solidification purification, whereby metal impurities are removed (refer to Step S16 in FIG. 3B).

Furthermore, as a conventional method for the above solidification purification, for example, a method is known in which a raw metal is fed into a water-cooled crucible of an electron beam melting furnace and fully melted by irradiating the entire surface of the raw metal with an electron beam, then the irradiation range of the electron beam is narrowed by controlling a deflecting coil (refer to Japanese Patent No. 3848816).

However, the above conventional silicon purification method has a problem in that time-consuming reduced-pressure purification needs to be conducted twice, and, in order to reliably purify higher-purity silicon, time-consuming solidification purification need to be conducted twice, whereby the number of processes increases and the time necessary for silicon purification lengthens.

If a metallic silicon material with an extremely low impurity concentration is used as a starting material, high purity silicon can be obtained with a single solidification purification process, but the cost of the starting material increases.

SUMMARY OF THE INVENTION

The present invention has been made to solve the above conventional problems and provides a silicon purification method that can shorten the purification time of a metallic silicon material and purify high-purity silicon at a low cost.

A silicon purification method of the present invention includes: loading a base material that is a starting material made of metallic silicon into a graphite crucible, heating and melting all of the base material which is disposed in an acidic inert gas atmosphere, maintaining the molten base material in the graphite crucible, and thereby oxidatively purifying the base material (oxidation-purification step); loading the oxidatively-purified base material into a water-cooled crucible, gradually solidifying the base material after the base material disposed in a high vacuum atmosphere is fully molten, and thereby removing an unsolidified portion (solidification-purification step); and fully melting the base material which is disposed in a high vacuum atmosphere and in which the unsolidified portion is removed, and maintaining the base material in the water-cooled crucible (reduced-pressure purification step).

In the silicon purification method of the present invention, it is preferable that the starting material include phosphorus (P), iron (Fe), aluminum (Al), and calcium (Ca); the concentration of phosphorus be less than or equal to 25 ppm; the concentration of iron be less than or equal to 890 ppm; the concentration of aluminum be less than or equal to 960 ppm; and the concentration of calcium be less than or equal to 150 ppm.

In the silicon purification method of the present invention, it is preferable that the starting material include phosphorus (P), iron (Fe), aluminum (Al), and calcium (Ca); the concentration of phosphorus be less than or equal to 25 ppm; the concentration of iron is less than or equal to 350 ppm; the concentration of aluminum be less than or equal to 260 ppm; and the concentration of calcium be less than or equal to 7 ppm.

In the silicon purification method of the present invention, it is preferable that the starting material be silicon metal in powder form.

In the oxidation-purification step of the silicon purification method of the present invention, it is preferable that the base material be disposed in a vapor-added Ar gas atmosphere, a molten metal portion be obtained by heating and melting the base material using plasma arc, the heating of the molten metal portion be continuously maintained for a predetermined period of time, and at least boron (B) and carbon (C) be removed.

In the solidification-purification step of the silicon purification method of the present invention, it is preferable that the base material having a lump form be disposed in a high vacuum atmosphere, the entire area of the base material be irradiated with the electron beam, and the base material be thereby fully molten; the molten base material be gradually solidified from a bottom of molten metal in the base material toward a surface of molten metal by gradually weakening an output of the electron beam, and the solidification proceeds so that the solidifying portion occupies a predetermined ratio of the entire of base material; and at least iron (Fe), aluminum (Al), calcium (Ca), titanium (Ti) be removed by removing a molten metal portion that is not solidified.

In the reduced-pressure purification step of the silicon purification method of the present invention, it is preferable that, after the removal of the unsolidified portion, the entire area of the base material in the water-cooled crucible be continuously irradiated with the electron beam and the base material be molten, and a molten metal portion be thereby obtained; and at least phosphorus (P) be removed by volatilization in a vacuum refining method in which electron beam irradiation is continued for a predetermined period of time.

Advantageous Effects of Invention

According to the present invention, it is possible to realize purification which does not depend on the form of the starting material by using metallic silicon as a starting material and subjecting this metallic silicon to oxidative purification, and then solidification purification and reduced-pressure purification.

In addition, high-purity silicon can be obtained with a single solidification purification process and a single reduced-pressure purification process, whereby the present invention can shorten the purification time and purify high-purity silicon at a low cost.

DESCRIPTION OF THE PREFERRED EMBODIMENTS

Hereinafter, the present invention will be described in detail with reference to the accompanying drawings.

The technical scope of the present invention is not limited to the following embodiments, and a variety of modifications can be added so long as they do not depart from the purport of the present invention.

FIGS. 1A to 1D and FIGS. 2A to 2D are cross sectional views schematically explaining the silicon purification order according to the present invention.

Figure 3A:
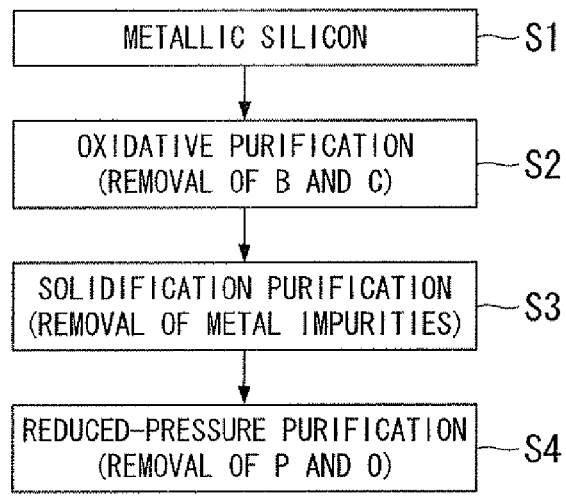
FIG. 3A is a flow chart explaining the silicon purification order according to the present invention.

In addition, FIG. 3A is a flow chart explaining the silicon purification order according to the present invention.

Figure 3B:
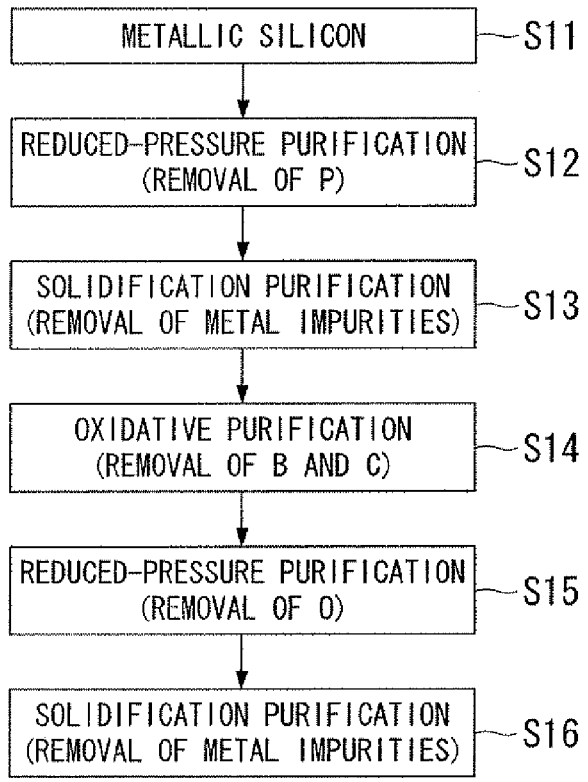
FIG. 3B is a flow chart explaining a conventional silicon purification order.

FIG. 3B is a flow chart explaining a conventional silicon purification order.

Figure 1A:
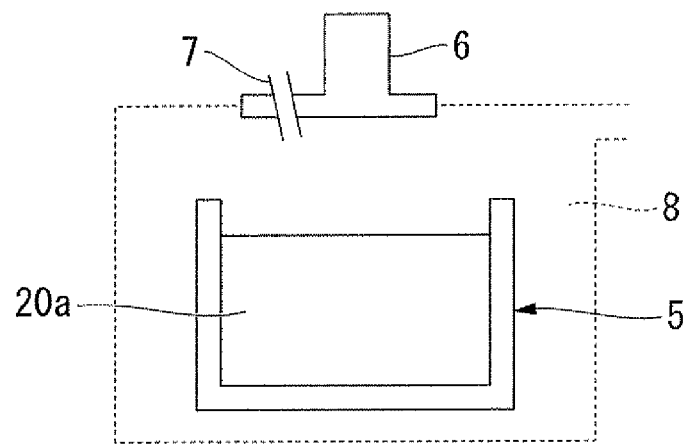
FIG. 1A is a cross sectional view schematically explaining the silicon purification order according to the present invention.
Figure 1B:
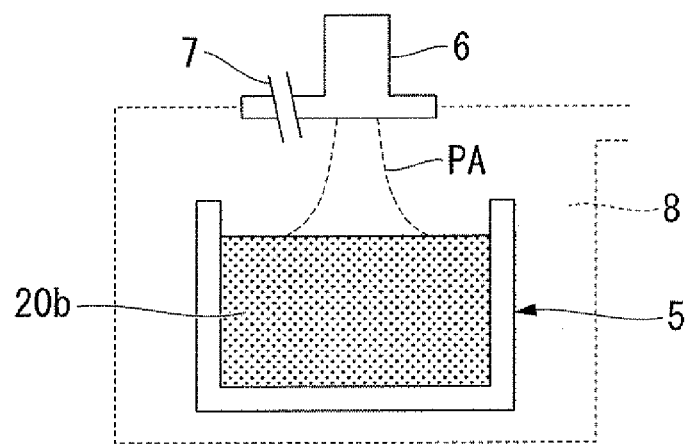
FIG. 1B is a cross sectional view schematically explaining the silicon purification order according to the present invention.

Meanwhile, FIGS. 1A and 1B are views explaining the oxidative purification of the present invention (corresponding views to Steps S1 and S2 in FIG. 3A).

Figure 1C:
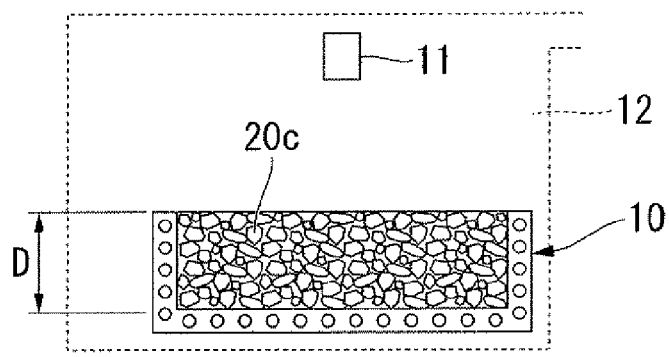
FIG. 1C is a cross sectional view schematically explaining the silicon purification order according to the present invention.
Figure 1D:
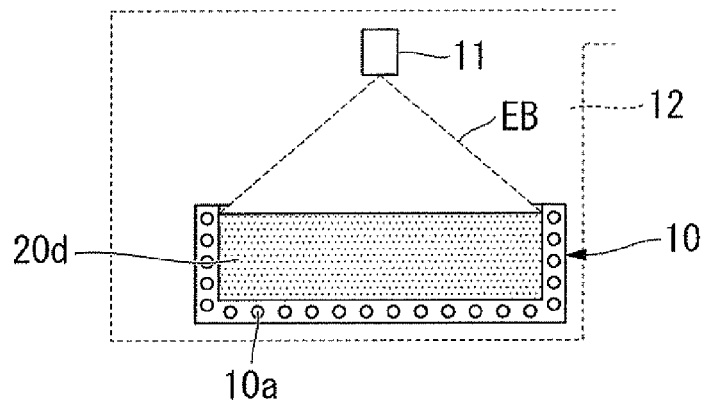
FIG. 1D is a cross sectional view schematically explaining the silicon purification order according to the present invention.
Figure 2A:
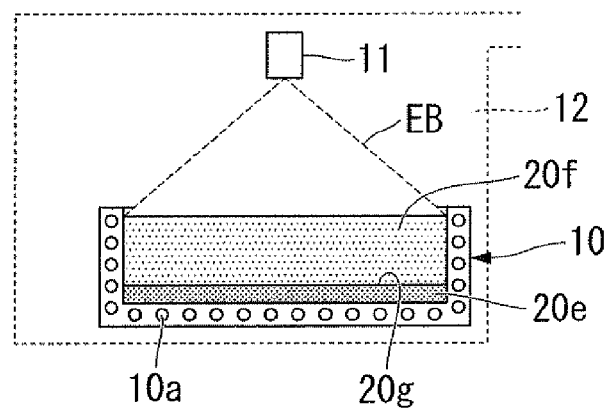
FIG. 2A is a cross sectional view schematically explaining the silicon purification order according to the present invention.
Figure 2B:
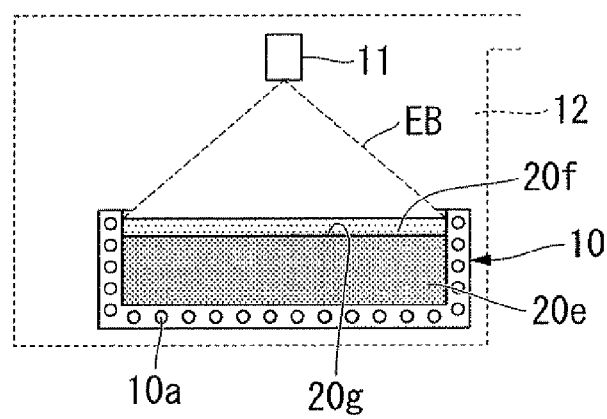
FIG. 2B is a cross sectional view schematically explaining the silicon purification order according to the present invention.
Figure 2C:
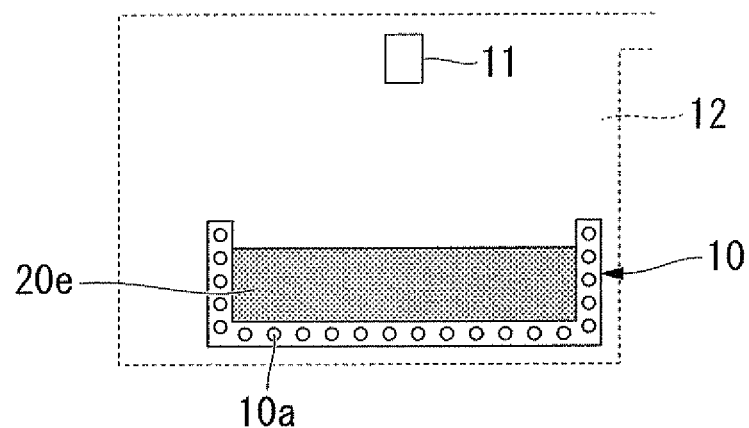
FIG. 2C is a cross sectional view schematically explaining the silicon purification order according to the present invention.
Figure 2D:
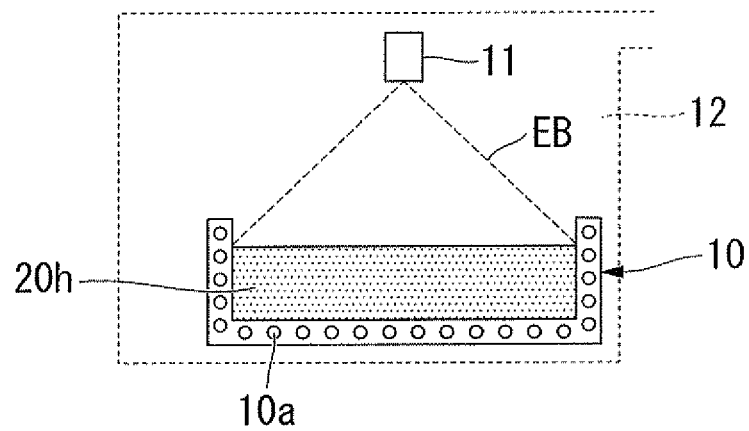
FIG. 2D is a cross sectional view schematically explaining the silicon purification order according to the present invention.

FIGS. 1C, 1D and FIGS. 2A to 2C are views explaining the solidification purification of the present invention (a corresponding view to Step S3 in FIG. 3A), and FIG. 2D is a view explaining the reduced-pressure purification of the present invention (a corresponding view to Step S4 in FIG. 3A).

As shown in FIGS. 1A and 1B, a graphite crucible 5 is provided in a plasma heating and melting furnace.

A plasma arc-generating device 6 includes, for example, a plasma torch and a high voltage power supply and is disposed so as to face the opening portion of the graphite crucible 5.

The plasma arc-generating device 6 generates an arc discharge in an inert gas atmosphere 8 which has been generated by an inert gas injected from an inert gas inlet port 7 and thus generates a plasma arc PA in a space between the plasma arc-generating device 6 and the graphite crucible 5, thereby melting the metallic silicon material which has been loaded into the graphite crucible 5.

Here, an oxidizing gas is used as the inert gas, and, for example, a water vapor-added argon (Ar) gas is used.

In FIGS. 1C and 1D, and FIGS. 2A to 2C, a water-cooled crucible provided in an electron beam melting furnace, and, here, a shallow water-cooled copper hearth is used.

Water passages 10a are disposed in the bottom portion and four side portions of the water-cooled crucible (water-cooled copper hearth) 10.

The water passages 10a constitute a water-cooling mechanism provided in the water-cooled copper hearth 10.

This water-cooled copper hearth 10 is disposed in a high vacuum atmosphere 12 in the electron beam melting furnace.

Here, the high vacuum atmosphere 12 is desirably $10^{-2}$ Pa or less.

In addition, an electron beam irradiation device 11 is disposed so as to face the opening portion of the water-cooled copper hearth 10.

The electron beam irradiation device 11 includes, for example, an electron gun and a deflecting coil, and irradiates, with electron beam EB outputted from the electron gun, the metallic silicon material filling the water-cooled copper hearth 10, thereby melting the metal material.

The water-cooling mechanism cools and thus solidifies the molten metal.

First of all, as shown in FIG. 1A, a metallic silicon material (a base material made of metallic silicon) 20a is prepared as a starting material (Step S1 in FIG. 3A) and loaded into the graphite crucible 5.

The silicon material 20a desirably has, for example, an iron (Fe) content of 100 ppm<Fe<500 ppm, and an aluminum (Al) content of 100 ppm<Al<500 ppm.

That is, the iron content is desirably greater than 100 ppm and less than 500 ppm, and the aluminum content is desirably greater than 100 ppm and less than 500 ppm.

As a starting material satisfying such impurity concentration conditions, an acid-leached silicon metal in powder form is used, and can be easily obtained from commercially available metallic silicon materials at a low cost.

Next, as shown in FIG. 1B, water vapor-added Ar gas is injected from the inert gas inlet port 7 as an oxidizing gas, and plasma arc PA is generated in an inert gas (oxidizing gas) atmosphere 8 by the plasma arc-generating device 6.

Molten metallic silicon 20b is obtained by heating and fully melting the silicon material in powder form 20a, and is oxidatively purified by maintaining this molten metallic silicon 20b for a predetermined period of time (Step S2 in FIG. 3A).

Then, lump-formed metallic silicon material 20c is obtained by cooling the molten metallic silicon 20b, thereby obtaining ingots, and crushing the ingots.

By the above oxidative purification, impurities of boron (B), carbon (C), and the like are removed, whereby metallic silicon with a low impurity concentration of B, C, and the like can be obtained from the starting material of the metallic silicon material 20a.

However, in the above metallic silicon from which B, C, and the like have been removed, impurities of iron (Fe), aluminum (Al), calcium (Ca), titanium (Ti), and the like, and furthermore, impurities of phosphorus (P), oxygen (O), and the like are still present.

Fe, Al, Ca, Ti, and the like can be removed by the following solidification purification.

Next, as shown in FIG. 1C, the lump-formed metallic silicon material 20c which is oxidatively purified in the above described manner is loaded into the shallow water-cooled copper hearth 10.

Meanwhile, the water-cooled copper hearth 10 desirably has dimensions such that a depth D is at least 4 times the size of the shorter of either the length or width of the water-cooled crucible.

When the shorter one of the width dimension and length dimension of the water-cooled crucible is smaller than four times the depth D, the area of the water-cooled crucible is small with respect to the depth, and the meltage is small, whereby productivity does not improve.

Next, as shown in FIG. 1D, the electron beam irradiation device 11 irradiates, with an electron beam EB, the entire surface of the water-cooled copper hearth 10 into which the lump-formed silicon material 20c has been loaded, so that the lump-formed silicon material 20c is fully molten, whereby molten metallic silicon 20d is obtained.

Meanwhile, at this time, if the water-cooled copper hearth 10 is, for example, a pool with a molten metal depth d1 of from 20 mm to 50 mm, it is preferable to melt the metallic silicon material by irradiating, with the electron beam, the entire surface with the irradiation density of the electron beam set within a range of from 1500 kW/m$^2$ to 3000 kW/m$^2$.

If the irradiation density of the electron beam is 1500 kW/m$^2$ or less, it is not possible to sufficiently melt the silicon material.

Conversely, if the irradiation density of the electron beam is 3000 kW/m$^2$ or more, a disadvantage of exceeding the water-cooling capacity of the cooling pipes 10a occurs.

Next, as shown in FIG. 2A, the molten metallic silicon 20d is gradually solidified from the bottom of the water-cooled copper hearth 10 by gradually weakening the irradiation output (irradiation density) of the electron beam EB without varying the irradiation width of the electron beam EB (the electron beam EB is still irradiated over the entire surface), whereby a solidified portion 20e becomes formed.

At this time, impurities, such as Fe, Al, Ca, Ti, and the like, are condensed mainly in a molten metal portion 20f which is not yet solidified (unsolidified portion).

With the interface 20g between the solidified portion 20e and the molten metal portion 20f as a boundary, the impurity concentration of the solidified portion (impurity-purified portion) 20e is much lower than the impurity concentration of the molten metal portion (impurity-condensed portion) 20f.

Meanwhile, in FIG. 2A, impurities, such as Fe, Al, Ca, Ti, and the like, are present mainly in the molten metal portion 20f, but if the solidification speed is too fast, these impurities remain even in the solidified portion 20e, whereby it is not possible to solidification-purify high-purity silicon.

Therefore, the irradiation output of the electron beam EB is controlled so that, for example, the solidification speed becomes 2 mm/min or less, that is, the irradiation output is gradually weakened.

Since the shallow water-cooled copper hearth 10 can easily emit heat at the bottom, it is possible to enlarge the temperature gradient of a liquid phase along the perpendicular direction to the solidification interface around the interface between liquid phase and solid phase (solidification interface) by gradually weakening the irradiation output (irradiation density) of the electron beam EB while irradiating the entire surface of the molten metallic silicon 20d with the electron beam EB.

By controlling the solidification speed at 2 mm/min or less while obtaining the above effect, it is possible to suppress compositional supercooling and to increase the purification effect.

Next, as shown in FIGS. 2B and 2C, if the output of the electron beam irradiated over the entire surface is gradually weakened, solidification proceeds and the interface 20g between the impurity-purified portion (solidified portion) 20e and the impurity-condensed portion (molten metal portion) 20f moves up, therefore, before long, the ratio of the impurity-purified portion (solidified portion) 20e becomes greater than the ratio of the impurity-condensed portion (molten metal portion) 20f in the entire base material.

Additionally, at a point of time when the solidification proceeds so that the solidifying portion occupies a predetermined ratio of the entire base material, the water-cooled copper hearth 10 is tilted, whereby the impurity-condensed portion (molten metal portion) 20f is cast and removed (thus far, Step S3 in FIG. 3A).

At this time, when at least the ratio of the impurity-condensed portion (molten metal portion) 20f exceeds the impurity-purified portion (solidified portion) 20e, the water-cooled copper hearth 10 is tilted, and the impurity-condensed portion (molten metal portion) 20f is cast and removed.

Desirably, when the ratio of the impurity-condensed portion (molten metal portion) 20f becomes 40% or less of the entire body (the solidified portion 20e and the molten metal portion 20f), the water-cooled copper hearth 10 is tilted, and the impurity-condensed portion (molten metal portion) is cast and removed.

Furthermore, desirably, when the ratio of the impurity-condensed portion (molten metal portion) 20f becomes 20% of the entire body, the water-cooled copper hearth 10 is tilted, and the impurity-condensed portion (molten metal portion) 20f is cast and removed.

Meanwhile, at this time, it is also possible to, firstly, solidify the entire body and re-melt a portion in which impurities to remove are condensed, whereby the impurity-condensed portion is cast and removed.

In the above solidification purification, impurities present mainly in the impurity-condensed portion (molten metal portion) 20f, such as Fe, Al, Ca, Ti and the like, are removed by the above casting.

Therefore, it is possible to obtain metallic silicon having a low impurity concentration of B, C, and the like, and a little amount of impurities, such as Fe, Al, Ca, Ti and the like.

However, in the remaining impurity-purified portion (solidified portion) 20e from which the impurity-condensed portion 20f has been removed, impurities, such as P and O, are still present.

These impurities of P and O can be removed by volatilization by reduced-pressure purification according to the vacuum refining method.

Next, as shown in FIG. 2D, the electron beam EB is further irradiated over the entire surface of the remaining impurity-purified portion (solidified portion) 20e from which the impurity-condensed portion 20f has been removed, and the impurity-purified portion 20e is again fully molten so as to obtain molten metallic silicon 20h, and, even after the impurity-purified portion 20e has been fully molten, irradiation of the electron beam continues for a predetermined period of time, whereby reduced-pressure purification is conducted (Step S4 in FIG. 3A).

Then, irradiation of the electron beam is stopped, and the molten metallic silicon 20h is fully solidified.

Through the above reduced-pressure purification, P and O contained in the molten metallic silicon 20h are volatilized.

Therefore, high-purity silicon that has a low impurity concentration of B, C, and the like, a low impurity concentration of Fe, Al, Ca, P, and the like, and a low impurity concentration of P and O, and is suitable for, for example, manufacturing solar cells can be obtained.

As described in the above, according to the present invention, it is possible to realize purification which does not depend on the form of the starting material by using the metallic silicon material 20a as a starting material, and by subjecting the metallic silicon to the oxidative purification (Step S2 in FIG. 3A), and then the solidification purification (Step S3 in FIG. 3A) and the reduced-pressure purification (Step S4 in FIG. 3A), high-purity silicon can be obtained by a single solidification purification process and a single process of reduced-pressure purification.

Consequently, it is possible to shorten the purification time and purify high-purity silicon at a low cost.

The present invention includes a process that begins by conducting oxidative purification (a process that oxidatively purifies the starting material), but the above oxidative purification can be applied even when a starting material to be used is in powder form or lump form, or in ingots, therefore it is possible to realize purification which does not depend on the form of the starting material.

In addition, the present invention allows reduced-pressure purification to be conducted after oxidative purification, therefore P and O can be removed simultaneously by a single process of reduced-pressure purification, whereby the number of processes decreases and thus the purification time can be shortened.

In addition, since solidification purification and reduced-pressure purification are conducted at a water-cooled copper hearth in one electron beam melting furnace, there are no consumables and high-purity silicon can be purified within a short time and at a low cost, whereby it is possible to improve the production volume thereof on account of shortened purification time and silicon can be produced at a low cost.

Furthermore, it is desirable to use an acid-leached metallic silicon material in powder form having impurity concentrations of Fe and Al in a range of 100 ppm<Fe<500 ppm and 100 ppm<Al<500 ppm as a starting material, but such silicon material in powder form can be easily obtained from low-priced commercially available products, whereby high-purity silicon can be produced at a low cost.

EXAMPLES

Next, the present invention will be described in detail based on the results obtained from Experimental Examples 1 to 5.

Experimental Example 1

First of all, an acid-leached metallic silicon material in powder form is prepared as a starting material, and this acid-leached metallic silicon material in powder form is loaded into a graphite crucible in a plasma heating and melting furnace (refer to FIG. 1A).

Here, the concentrations of impurities contained in the metallic silicon material are: P=25 ppm, Fe<500 ppm, Al<500 ppm, and Ca<10 ppm (that is, the concentration of P is 25 ppm; the concentration of Fe is less than 500 ppm; the concentration of Al is less than 500 ppm; and the concentration of Ca is less than 10 ppm).

Next, the loaded metallic silicon material in powder form is heated and fully molten using a water vapor-added Ar plasma, and this molten metallic silicon is maintained for a predetermined period of time (refer to FIG. 1B), then cooled so as to form ingots, and these ingots are crushed, whereby metallic silicon material in lump form was obtained.

Next, the lump-formed metallic silicon material is loaded into a water-cooled copper hearth of an electron beam melting furnace (refer to FIG. 1C).

Then, the loaded metallic silicon material in lump form is irradiated with an electron beam over the entire surface in a high vacuum atmosphere with a pressure of $10^{-2}$ Pa or less and the metallic silicon material was fully molten (refer to FIG. 1D).

Next, the output of the electron beam is gradually weakened without varying the irradiation width of the electron beam (while the electron beam is still irradiated over the entire surface) so that the solidification speed of the molten metallic silicon in the depth direction of the water-cooled copper hearth becomes 2 mm/min.

Therefore, the molten metallic silicon is gradually solidified in a single direction from the bottom of the hearth toward the surface of the molten metal (refer to FIG. 2A).

Additionally, when the interface between an impurity-purified portion (solidified portion) and an impurity-condensed portion (molten metal portion) moves up so that the impurity-condensed portion makes up 30% of the entire body (refer to FIG. 2B), the impurity-condensed portion (molten metal portion) is removed by tilting the water-cooled copper hearth (refer to FIG. 2C).

Next, the remaining impurity-purified portion from which the impurity-condensed portion has been removed was further irradiated with an electron beam over the entire surface in a high vacuum atmosphere with a pressure of $10^{-2}$ Pa or less, and the impurity-purified portion was again fully molten.

Even after the impurity-purified portion has been fully molten, irradiation of the electron beam continued for a predetermined period of time (refer to FIG. 2D).

Then, irradiation of the electron beam is stopped and the molten metallic silicon is solidified, whereby purified silicon of Experimental Example 1 was obtained.

The impurity concentrations of the purified silicon of Experimental Example 1 are shown in Table 1 below.

The units for all numeric values in Tables 1 to 4 below are ppm.

TABLE 1

|  | Fe | Al | Ca | Ti | P | B | C |
|---|---|---|---|---|---|---|---|
| Raw material Si | 350 | 260 | 7 | 5 | 25 | 20 | 400 |
| After purification | <0.1 | <0.1 | <0.1 | <0.1 | <0.1 | 0.2 | 3 |

In silicon used for manufacturing solar cells, any of the impurity concentrations of Fe, Al, Ca, Ti, and P needs to be less than 0.1 ppm.

According to Experimental Example 1, it is possible to obtain silicon that satisfies the above conditions with a single solidification purification process.

Experimental Example 2

First of all, a non-acid-leached metallic silicon material is prepared as a starting material, and this non-acid-leached metallic silicon material is loaded into the graphite crucible in the plasma heating and melting furnace.

Here, the concentrations of impurities contained in the metallic silicon material are: P=25 ppm, Fe=1950 ppm, Al=1800 ppm, and Ca=200 ppm (that is, the concentration of P is 25 ppm; the concentration of Fe is 1950 ppm; the concentration of Al is 1800 ppm; and the concentration of Ca is 200 ppm).

Next, in the same manner as Experimental Example 1, the loaded metallic silicon material is heated and fully molten using the water vapor-added Ar plasma, and this molten metallic silicon is maintained for a predetermined period of time, then cooled so as to form ingots, and these ingots are crushed, whereby metallic silicon material in lump form was obtained.

Next, in the same manner as Experimental Example 1, the lump-formed metallic silicon material is loaded into the water-cooled copper hearth of the electron beam melting furnace.

Then, the loaded metallic silicon material in lump form is irradiated with an electron beam over the entire surface in a high vacuum atmosphere with a pressure of $10^{-2}$ Pa or less and the metallic silicon material was fully molten.

Next, in the same manner as Experimental Example 1, the output of the electron beam is gradually weakened without varying the irradiation width of the electron beam (while the electron beam is still irradiated over the entire surface) so that the solidification speed of the molten metallic silicon in the depth direction of the water-cooled copper hearth becomes 2 mm/min.

Therefore, the molten metallic silicon is gradually solidified in a single direction from the bottom of the hearth toward the surface of the molten metal.

Additionally, in the same manner as Experimental Example 1, when the interface between an impurity-purified portion (solidified portion) and an impurity-condensed portion (molten metal portion) moves up so that the impurity-condensed portion makes up 30% of the entire body, the impurity-condensed portion (molten metal portion) is removed by tilting the water-cooled copper hearth.

Next, in the same manner as Experimental Example 1, the remaining impurity-purified portion from which the impurity-condensed portion has been removed was further irradiated with an electron beam over the entire surface in a high vacuum atmosphere with a pressure of $10^{-2}$ Pa or less, and the impurity-purified portion was again fully molten.

Even after the impurity-purified portion has been fully molten, irradiation of the electron beam continued for a predetermined period of time.

Then, irradiation of the electron beam is stopped and the molten metallic silicon is solidified, whereby purified silicon of Experimental Example 2 was obtained.

The impurity concentrations of the purified silicon of Experimental Example 2 are shown in Table 2 below.

TABLE 2

|  | Fe | Al | Ca | Ti | P | B | C |
|---|---|---|---|---|---|---|---|
| Raw material Si | 1950 | 1800 | 200 | 8 | 25 | 20 | 400 |
| After purification | 260 | 132 | 31 | <0.1 | <0.1 | 0.2 | 3 |

In Experimental Example 2, the impurity concentrations of the non-acid-leached starting material are higher than those in Experimental Example 1, therefore the cost for a raw material can be reduced, but none of the impurity concentrations of Fe, Al, and Ca are sufficiently decreased.

Therefore, two solidification purification processes are required, whereby the yield rate decreases by 10% and the electrical power consumption rate increases by 25%.

Experimental Example 3

First of all, an acid-leached metallic silicon material is prepared as a starting material, and this acid-leached metallic silicon material is loaded into the graphite crucible in the plasma heating and melting furnace.

Here, the concentrations of impurities contained in the metallic silicon material are: P=25 ppm, Fe=890 ppm, Al=960 ppm, and Ca=150 ppm (that is, the concentration of P is 25 ppm; the concentration of Fe is 890 ppm; the concentration of Al is 960 ppm; and the concentration of Ca is 150 ppm).

Next, in the same manner as Experimental Example 1, the loaded metallic silicon material is heated and fully molten using the water vapor-added Ar plasma, and this molten metallic silicon is maintained for a predetermined period of time, then cooled so as to form ingots, and these ingots are crushed, whereby metallic silicon material in lump form was obtained.

Next, in the same manner as Experimental Example 1, the metallic silicon material in lump form is loaded into the water-cooled copper hearth of the electron beam melting furnace.

Then, the loaded metallic silicon material in lump form is irradiated with the electron beam over the entire surface in a high vacuum atmosphere with a pressure of $10^{-2}$ Pa or less and the metallic silicon material was fully molten.

Next, in the same manner as Experimental Example 1, the output of the electron beam is gradually weakened without varying the irradiation width of the electron beam (while the electron beam is still irradiated over the entire surface) so that the solidification speed of the molten metallic silicon in the depth direction of the water-cooled copper hearth becomes 2 mm/min.

Therefore, the molten metallic silicon is gradually solidified in a single direction from the bottom of the hearth toward the surface of the molten metal.

Additionally, in the same manner as Experimental Example 1, when the interface between an impurity-purified portion (solidified portion) and an impurity-condensed portion (molten metal portion) moves up so that the impurity-condensed portion makes up 30% of the entire body, the impurity-condensed portion (molten metal portion) is removed by tilting the water-cooled copper hearth.

Next, in the same manner as Experimental Example 1, the remaining impurity-purified portion from which the impurity-condensed portion has been removed was further irradiated with an electron beam over the entire surface in a high vacuum atmosphere with a pressure of $10^{-2}$ Pa or less, and the impurity-purified portion was again fully molten.

Even after the impurity-purified portion has been fully molten, irradiation of the electron beam continued for a predetermined period of time.

Then, irradiation of the electron beam is stopped and the molten metallic silicon is solidified, whereby purified silicon of Experimental Example 3 was obtained.

The impurity concentrations of the purified silicon of Experimental Example 3 are shown in Table 3 below.

TABLE 3

|  | Fe | Al | Ca | Ti | P | B | C |
|---|---|---|---|---|---|---|---|
| Raw material Si | 890 | 960 | 150 | 7 | 25 | 21 | 410 |
| After purification | 90 | 75 | 3 | <0.1 | <0.1 | 0.2 | 3 |

In Experimental Example 3, the impurity concentrations of the starting material are higher than those in Experimental Example 1, therefore none of the impurity concentrations of Fe, Al, and Ca satisfies the concentration being less than 0.1 ppm, which is necessary to manufacture solar cells.

However, compared with Experimental Example 2, any of the impurity concentrations of Fe, Al, and Ca in Experimental Example 3 can be significantly reduced.

Meanwhile, compared with Experimental Example 3, Experimental Example 1 can further decrease the impurity concentrations of Fe, Al, and Ca by as much as one order of magnitude.

Experimental Example 4

First of all, an acid-leached metallic silicon is prepared as a starting material, and this acid-leached metallic silicon material is loaded into the graphite crucible in the plasma heating and melting furnace.

Here, the concentrations of impurities contained in the metallic silicon material are: P=25 ppm, Fe<100 ppm, Al<100 ppm, and Ca<10 ppm (that is, the concentration of P is 25 ppm; the concentration of Fe is less than 100 ppm; the concentration of Al is less than 100 ppm; and the concentration of Ca is less than 10 ppm).

Next, in the same manner as Experimental Example 1, the metallic silicon material in lump form is loaded into a water-cooled copper hearth of an electron beam melting furnace.

Then, the loaded metallic silicon material in lump form is irradiated with an electron beam over the entire surface in a high vacuum atmosphere with a pressure of $10^{-2}$ Pa or less and the metallic silicon material was fully molten.

Next, in the same manner as Experimental Example 1, the output of the electron beam is gradually weakened without varying the irradiation width of the electron beam (while the electron beam is still irradiated over the entire surface) so that the solidification speed of the molten metallic silicon in the depth direction of the water-cooled copper hearth becomes 2 mm/min.

Therefore, the molten metallic silicon is gradually solidified in a single direction from the bottom of the hearth toward the surface of the molten metal.

Additionally, in the same manner as the Experimental Example 1, when the interface between an impurity-purified portion (solidified portion) and an impurity-condensed portion (molten metal portion) moves up so that the impurity-condensed portion occupies 20% of the entire body, the impurity-condensed portion (molten metal portion) is removed by tilting the water-cooled copper hearth.

Next, in the same manner as the Experimental Example 1, the remaining impurity-purified portion from which the impurity-condensed portion has been removed was further irradiated with an electron beam over the entire surface in a high vacuum atmosphere with a pressure of $10^{-2}$ Pa or less, and the impurity-purified portion was again fully molten.

Even after the impurity-purified portion has been fully molten, irradiation of the electron beam continued for a predetermined period of time.

Then, irradiation of the electron beam is stopped and the molten metallic silicon is solidified, whereby purified silicon of Experimental Example 4 was obtained.

The impurity concentrations of the purified silicon of Experimental Example 4 are shown in Table 4 below.

TABLE 4

| | Fe | Al | Ca | Ti | P | B | C |
|---|---|---|---|---|---|---|---|
| Raw material Si | 50 | 20 | 1 | 1 | 20 | 18 | 400 |
| After purification | <0.1 | <0.1 | <0.1 | <0.1 | <0.1 | 0.2 | 3 |

In Experimental Example 4, since the impurity concentrations of the starting material are lower than those in Experimental Example 1, the final impurity concentrations satisfy the above conditions that are suitable for manufacturing solar cells.

However, while the purification cost is equal to that of Experimental Example 1, the cost of raw materials is several times that of Experimental Example 1.

Experimental Example 5

An acid-leached metallic silicon material in powder form was fed into the water-cooled copper hearth, and irradiated with an electron beam in a high vacuum atmosphere with a pressure of $10^{-2}$ Pa or less, but half or more of the metallic silicon material in powder form was scattered into air, therefore it was not possible to melt the metallic silicon material.

Industrial Applicability

As described in the above, the present invention is useful for a silicon purification method that can shorten the purification time of a metallic silicon material and purify high-purity silicon at a low cost.

What is claimed is:

1. A silicon purification method, comprising:
   loading a base material that is a starting material made of metallic silicon into a graphite crucible, heating and melting all of the base material which is disposed in an oxidizing gas atmosphere, maintaining the molten base material in the graphite crucible, and thereby oxidatively purifying the base material;
   loading the oxidatively-purified base material into a water-cooled crucible, fully melting the oxidatively-purified base material disposed in a high vacuum atmosphere, and then gradually solidifying the molten oxidatively-purified base material and thereafter removing an unsolidified portion; and
   fully melting the base material which is disposed in a high vacuum atmosphere and in which the unsolidified portion is removed, and maintaining the base material in the water-cooled crucible.

2. The silicon purification method according to claim 1, wherein the starting material includes phosphorus (P), iron (Fe), aluminum (Al), and calcium (Ca);
   a concentration of phosphorus is less than or equal to 25 ppm;
   a concentration of iron is less than or equal to 890 ppm;
   a concentration of aluminum is less than or equal to 960 ppm; and
   a concentration of calcium is less than or equal to 150 ppm.

3. The silicon purification method according to claim 1, wherein the starting material includes phosphorus (P), iron (Fe), aluminum (Al), and calcium (Ca);
   a concentration of phosphorus is less than or equal to 25 ppm;
   a concentration of iron is less than or equal to 350 ppm;
   a concentration of aluminum is less than or equal to 260 ppm; and
   a concentration of calcium is less than or equal to 7 ppm.

4. The silicon purification method according to claim 1, wherein the starting material is silicon metal in powder form.

5. The silicon purification method according to claim 1, wherein
   in the oxidatively purifying of the base material,
   the base material is disposed in the oxidizing gas atmosphere, a molten metal portion is obtained by heating and melting the base material using plasma arc, the heating of the molten metal portion is continuously maintained for a predetermined period of time, and at least boron (B) and carbon (C) are removed.

6. The silicon purification method according to claim 1, wherein in the removing of the unsolidified portion;
   the base material having a lump form is disposed in a high vacuum atmosphere, the entire area of the base material is irradiated with the electron beam, and the base material is thereby fully molten;
   the molten base material is gradually solidified from a bottom of molten metal in the base material toward a surface of molten metal by gradually weakening an output of the electron beam, and the solidification proceeds so that the solidifying portion occupies a predetermined ratio of the entire of base material; and
   at least iron (Fe), aluminum (Al), calcium (Ca), titanium (Ti) are removed by removing a molten metal portion that is not solidified.

7. The silicon purification method according to claim 1, wherein when the base material in which the unsolidified portion is removed is fully molten, after the removal of the unsolidified portion, the entire area of the base material in the water-cooled crucible is continuously irradiated with the electron beam and the base material is molten, and a molten metal portion is thereby obtained; and
   at least phosphorus (P) is removed by volatilization in a vacuum refining method in which electron beam irradiation is continued for a predetermined period of time.

* * * * *